United States Patent
Crosby et al.

(10) Patent No.: US 6,366,302 B1
(45) Date of Patent: Apr. 2, 2002

(54) ENHANCED GRAPHIC USER INTERFACE FOR MOBILE RADIOTELEPHONES

(75) Inventors: Shelia Renee Crosby, Crystal Lake; Suthirug Num Pisutha-Arnond, Chicago; Kenneth W. Douros, Hoffman Estates; Christopher S. Gremo, Algonquin, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/218,324

(22) Filed: Dec. 22, 1998

(51) Int. Cl.[7] .................................................. G06F 3/00
(52) U.S. Cl. ........................ 345/786; 345/783; 345/816; 345/973
(58) Field of Search ................................ 345/326, 341, 345/352, 973, 783–787, 816–820, 700; 455/550, 564, 566

(56) References Cited

U.S. PATENT DOCUMENTS

| | | | |
|---|---|---|---|
| 4,425,627 A | 1/1984 | Eibner | 345/354 |
| 4,481,508 A | 11/1984 | Kamei et al. | 379/354 |
| 4,511,764 A | 4/1985 | Nakayama et al. | 379/354 |
| 4,653,086 A | 3/1987 | Laube | 379/93.19 |
| 5,175,759 A | 12/1992 | Metroka et al. | 455/569 |
| 5,187,797 A | 2/1993 | Nielsen et al. | 345/338 |
| 5,283,862 A | 2/1994 | Lund | 345/173 |
| 5,363,481 A | 11/1994 | Tilt | 345/352 |
| 5,381,461 A | 1/1995 | Baals et al. | 379/457 |
| 5,533,110 A | 7/1996 | Pinard et al. | 379/201 |

(List continued on next page.)

FOREIGN PATENT DOCUMENTS

| | | |
|---|---|---|
| EP | 0 227 327 A2 | 7/1987 |
| EP | 0 398 711 A2 | 11/1990 |
| EP | 0792056 | 8/1997 |
| GB | 2322508 | 8/1998 |
| GB | 2322513 | 8/1998 |
| WO | WO95/24707 | 9/1995 |
| WO | WO 98/48552 | 10/1998 ........ H04M/1/274 |

OTHER PUBLICATIONS

Motorola International 200 User's Manual, 57 pages.
Siemens S10, Digital GSM spec sheet, 1 page.
Nokia 611 User's Manual, 67 pages.
Nokia 6190 Owner's Manual, 17 pages.
Nokia 2180 Owner's Manual, 58 pages.
Philips Spark User's Manual, 47 pages.
Bell South, "Simon™ Mobile Communications Made Simple", 12 pgs.
Motorola, "Envoy Wireless Communicator" User's Guide, 10 pgs.
Motorola, "Marco Wirless Communicator" User's Guide, 2 pgs.
Motorola, PageWriter™ 2000 User Manual, 1998, 6 Pages.

*Primary Examiner*—Raymond J. Bayerl
*Assistant Examiner*—Sy D. Luu
(74) *Attorney, Agent, or Firm*—Paul J. Bartusiak; Randall S. Vaas

(57) ABSTRACT

A radiotelephone (200) has a display (208) that efficiently presents information such as lists and text fields. For each list, the display (208) presents a title message (300) with unique identification markings (332,334), an end-of-list indicator (340), and a dynamic scroll indicator (308) to indicate scrolling directions. A context-sensitive symbol (306) is displayed whenever a context sensitive menu is available for a highlighted item. A search function is incorporated to allow expert users to quickly find information. A notepad feature allows the most recent string of user input data to be stored and recalled so that the data is not accidentally appended to subsequently entered data. Specialized data entry modes such as an editor screen (900), an editor-with-list screen sequence, a set value list screen sequence, a toggle value screen sequence, and a form screen sequence provide efficient retrieval, display, and entry of information.

23 Claims, 10 Drawing Sheets

U.S. PATENT DOCUMENTS

| | | | |
|---|---|---|---|
| 5,555,172 A | 9/1996 | Potter | 455/456 |
| 5,561,705 A | 10/1996 | Allard et al. | 455/564 |
| 5,633,912 A | 5/1997 | Tsoi | 455/566 |
| 5,758,295 A | 5/1998 | Ahlberg et al. | 455/566 |
| 5,841,849 A | 11/1998 | Macor | 379/142 |
| 5,841,855 A | 11/1998 | Davidson et al. | 379/387 |
| 5,852,783 A * | 12/1998 | Tabe et al. | 455/550 |
| 5,999,827 A * | 12/1999 | Sudo et al. | 455/564 |
| 6,161,026 A * | 12/2000 | Uchida | 455/566 |
| 6,181,316 B1 * | 1/2001 | Little et al. | 345/123 |

* cited by examiner

ENHANCED GRAPHIC USER INTERFACE FOR MOBILE RADIOTELEPHONES

This application is related to co-pending application Ser. No. 09/218,588, filed Dec. 22, 1998, and co-pending application Ser. No. 09/218/594, filed Dec. 22, 1998, both of which are commonly assigned to this application.

FIELD OF THE INVENTION

This invention relates generally to a graphic user interface and more specifically to a user interface for a mobile radio telephone.

BACKGROUND OF THE INVENTION

With the widespread popularity of portable communication devices such as a mobile radiotelephones and wireless personal digital assistants, users of the devices are demanding user graphical user interfaces (GUI's) that are more intuitive and efficient. A new user does not want to spend a lot of time having to learn a complex user interface; both new and experienced users want a user interface that efficiently utilizes input actions. The small size of the displays on radiotelephones, however, has limited the creativity of GUI designers, and graphical prompts currently utilized for the GUI's of radiotelephones has been limited. In addition, the types of graphical prompts and the ways that they have been displayed provide only limited help in helping a user navigate through the many menus and fields of text that are typically received and transmitted in radiotelephone systems. The user quickly becomes disoriented while trying to navigate through the maze of information on a small radiotelephone display.

Currently, few manufacturers take full advantage of using visual feedback (graphic elements) as a way to orient and guide the user through the on-screen user interface of a mobile radiotelephone. In usability testing, most users have difficulty recognizing a list of items or options without some additional indication present on the display. Users then incorrectly assume the possible input choices available at any given time. This failure to recognize existing lists and input options inhibits the user from learning about basic radiotelephone menu/data scrolling and menu structure. This results in a significant impact on user performance in terms of the time it takes to complete a data input task and the error rates involved with data access. Usability testing also revealed that a context-sensitive menu, which provides additional functionality for the currently highlighted item, needs to be explicitly indicated for users to understand that the additional functionality exists.

Most graphics-based user interfaces utilize one or more context characteristics, such as the position of the current display screen with respect to a larger list or text field or the scrolling of data lines in response to keystrokes. When manufacturers do provide context characteristics into the user interface, other user interface functionality is compromised. For example, the available number of soft-keys can be reduced, thereby forcing the user to scroll through a list of options to perform even the most frequently used inputs.

Accordingly, there is a need for a radiotelephone user interface that incorporates various context characteristics (e.g. visual feedback through graphic elements) that are organized and functionally interconnected such that the user interface is more intuitive and efficient than any existing radiotelephone user interface. In addition, there is a need for a user interface that will reduce the number of errors resulting from human input. There is a further need for providing a user interface that allows a user to be aware of all of the possible input options that are available at a specific time.

Usability testing of radiotelephones has also revealed that users have difficulty entering data into the radiotelephone "phonebook." In addition, manufactures have either tailored the user interface of their radiotelephones for novices (e.g. easy to use user interface) or for experienced users (e.g. user interface not intuitive to a novice user).

For example, when entering data, all manufacturers use a serial process which requires the user to step through a series of data entry screens or editors. For example, in the phonebook function, the user must first enter the name, then press ENTER, then enter the telephone number, then press ENTER, and then enter the location. Users tended to become lost in this process because the user interface process failed to give the user an overview of the editors that will follow the currently displayed editor and there is no positive feedback that the previously entered data has been successfully executed.

The process for setting phone preferences of a radiotelephone is tedious because the user must navigate through a hierarchy and scroll through a list of values to accomplish the task. In one known application in the prior art, a cellular telephone manufacturer avoided the problem by making a flat menu which does not contain many features. This is not desirable since a feature-rich cellular telephone is what sets a cellular telephone apart from other cellular telephones. In another known application in the prior art, a cellular telephone manufacturer designed a user interface to allow for quick access to features by providing "shortcuts." To the novice user, however, the shortcuts are never learned because the shortcuts are not an extension of how the user learned to perform the task in question by the normal, long routine.

Accordingly, there is a need for a mobile telephone user interface with an intuitive method of entering data and setting telephone preferences. The intuitive interface will provide a telephone that is easy to use for the novice user. In addition, there is a need for the radiotelephone user interface that incorporates a method for entering data and setting preferences that allows for increased functionality for the more experienced user.

In one application in the prior art, a cellular telephone incorporates what is termed a scratch-pad feature. The scratch-pad allows a user to enter digits that are then presented on the display of the cellular telephone; the digits are also stored until the user manually removes them. Thus, if a user begins to enter a telephone number but then decides not to make the telephone call, he can forget to manually erase the entered digits. After a certain period of time, the digits will be erased from the display to conserve power, but the digits are still stored in the scratch-pad. When the user later begins to enter digits to make a new telephone call, the digits stored in the scratch-pad will be visible on the display, and the newly entered digits will be appended to the scratch-pad digits. This can cause the wrong telephone number to be entered and dialed, thereby causing confusion and frustration to the user. Accordingly, there is a need for a new way to store entered digits that do not automatically get appended to later, newly entered information.

BRIEF DESCRIPTION OF THE DRAWINGS

FIGS. 11A–11D shows how the editor-with-list screen sequence can have more than one information list to choose from;

DETAILED DESCRIPTION OF A PREFERRED EMBODIMENT

Figure 1:
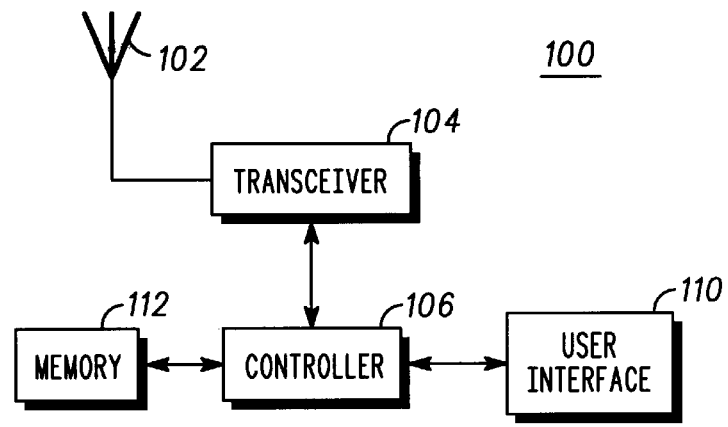
FIG. 1 is an illustration in block diagram form of a radiotelephone that can incorporate the enhanced graphic user interface (GUI)

FIG. 1 is an illustration in block diagram form of a radiotelephone 100. The radiotelephone 100 provides two-way voice communication and can also include data transfer functions such as internet connectivity, e-mail, and FAX capability.

To transmit radio frequency (RF) signals containing transmit data (such as voice, digital information, or control signals) from the radiotelephone 100, a user interface 110 directs user input data to a controller 106. The controller 106 typically includes a microprocessor, memory, a clock generator, a digital signal processor, and digital logic. The controller 106 formats the transmit data obtained from the user interface 110 and conveys it to a transmitter within transceiver 104 for conversion into RF modulated signals. The transceiver 104 conveys the RF modulated signals to the antenna 102 for transmission.

The radiotelephone 100 detects RF signals containing receive data through the antenna 102 and produces detected RF signals. A receiver within the transceiver 104, coupled to the antenna 102, converts the detected RF signals into electrical baseband signals, demodulates the electrical baseband signals, recovers the receive data, including automatic frequency control information, and outputs the receive data to the controller 106. The controller 106 formats the data into recognizable voice or data information for use by user interface 110.

The user interface 110 communicates the received information or voice to a user. Typically, the user interface 110 includes a microphone, a speaker, a display, and a plurality of input keys.

The memory 112 is coupled to the controller 106 and is for permanent and temporary storage of information, data, and software programs necessary for operation of the radiotelephone. For example, the memory 112 stores the graphic user interface (GUI) program that contains the commands for presenting information on the display.

Figure 2:
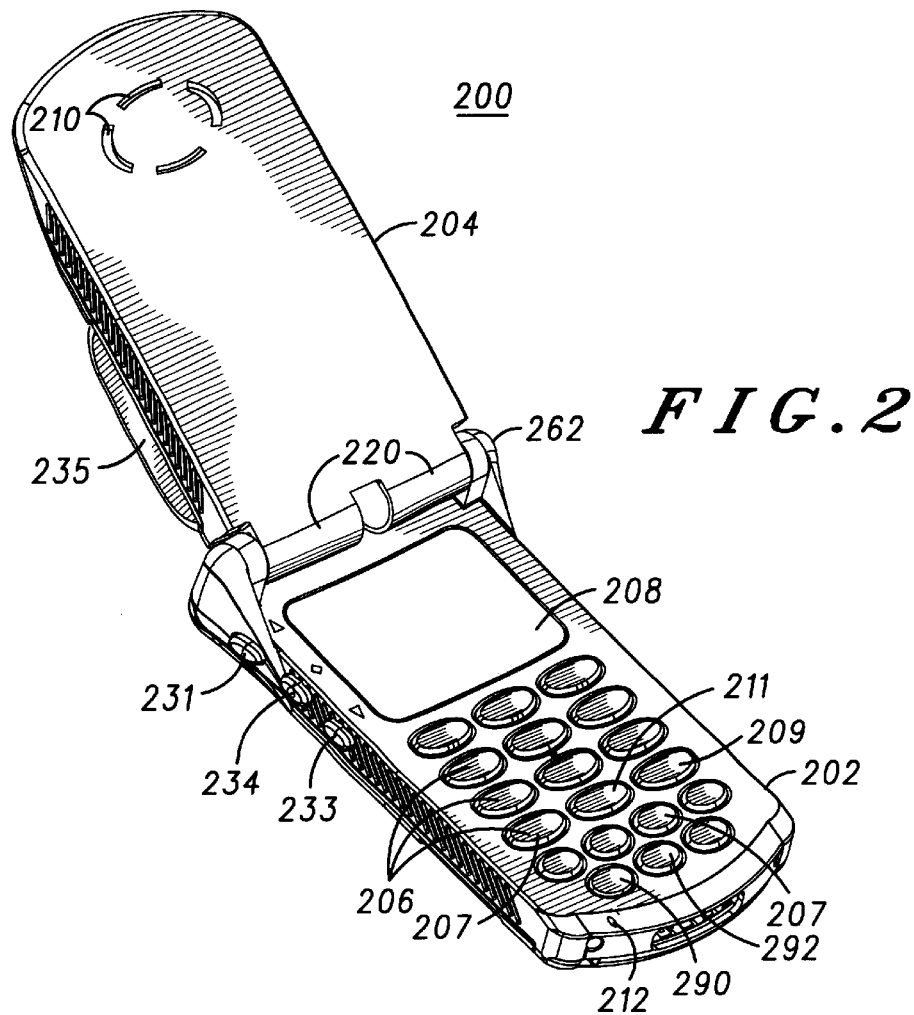
FIG. 2 is an outer view of an example radiotelephone that can incorporate the enhanced GUI.

FIG. 2 is an outer view of an example of a radiotelephone 200 that can employ the enhanced GUI. The radiotelephone 200 comprises a first housing element 202, also generally referred to as a radiotelephone housing, and a second housing element 204 that is movably connected to the first housing element 202. The first housing element 202 and the second housing element 204 are movably connected through a hinge 220.

Note that FIG. 2 is an example of a radiotelephone 200 that can employ the enhanced GUI. Radiotelephones with different physical configurations can also employ the enhanced GUI. For example, the radiotelephone 200 can comprise a single housing element, generally referred to as a housing element, rather than two housing elements that are movably connected.

In the illustrated embodiment, the second housing element 204 is formed to have an earpiece opening 210 for transmitting audio signals. A display 208, also referred to as a radiotelephone display, is mounted on the radiotelephone housing, here first housing element 202. The controller 106 (FIG. 1) is positioned in the first housing element 202 (or generally in the radiotelephone housing) and is coupled to the display 208. A plurality of input keys 206 are mounted on the first housing element 202 (radiotelephone housing) and electrically coupled to the controller 106 (FIG. 1). One of the plurality of input keys 206 serves is a MENU input key 207, which is used in part to cause the display 208 to present more options for a context-sensitive item of any of the various lists that is presented on the display 208. The first housing element 202 also carries the microphone 212.

The first housing element 202 also carries an access input key 234, an up input key 231, and a down input key 233. The access input key 234 is for activating information input and information retrieval functions for the radiotelephone. The up input key 231 is used to increase volume on the radiotelephone 200, and the down input key 233 is for decreasing the volume of the radiotelephone. In addition, the up input key 231 and the down input key 233 are used to scroll through menus and information presented on the display 208.

In addition, alternate key input key arrangements can be incorporated without the use of inventive faculty. For example, a single, multi-direction input key may be incorporated. This multi-direction input key can be used to indicate a desired directional input such as up, down, left, right, or some intermediate diagonal direction. The multi-direction input key may therefore have directional arrows printed directly on the physical input key.

In the illustrated embodiment the access input key 234, the up input key 231, and the down input key 233 are located on the first housing element 202; in an alternate embodiment they are disposed on the second housing element 204. In another alternate embodiment, separate buttons are not used for the access input key 234, the up input key 231, and the down input key 233. For example, some of the plurality of input keys 206 can also serve as the access input key 234, the up input key 231, and the down input key 233.

The enhanced GUI program is stored in the memory 112 (FIG. 1) and accessed by the controller 106 (FIG. 1) in order to control how information is presented on the display 208 (FIG. 2). Certain information to be presented on the display 208 is in list form. For example, the display presents various lists such as text messages, information lists, and menus. An example the various lists is a phonebook function, where a user can cause the controller 106 (FIG. 1) to present on the display 208 (FIG. 2) a list of names and telephone numbers. The various lists, however, can have more lines of text than can be presented on the display 208 at a single time. The enhanced GUI is optimized for a radiotelephone display and presents the various lists using a list display format.

Figure 3A:
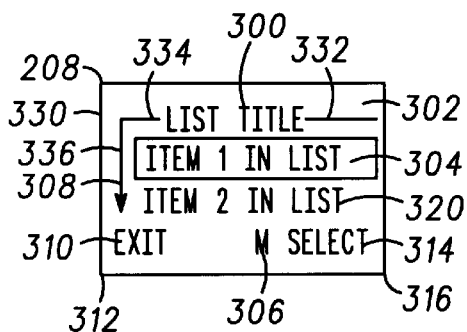
FIGS. 3A–3D shows the special display format that the enhanced GUI uses to present various lists on the radiotelephone display.

FIG. 3A through FIG. 3D shows the special display format that the enhanced GUI uses to present the various lists on the display 208. FIG. 3A shows how a top portion of any of the various lists is presented on the display 208. A title message 300 is presented at a top portion 302 of the display 208. The user can scroll down any of the various lists presented on the display 208, which then temporarily hides the title message 300; at any time, the user can scroll back to the top of and of the various lists presented on the display 208 for clarification as to where the user is currently located within the various lists. Thus, as the user moves from one area of the menu system within the enhance GUI to another area, the first thing that appears at the top portion 302 of the display 208 is the title message 300.

A highlighter 304 is presented on the display 208 to highlight a currently displayed item of any of the various lists. The highlighter 304 is for indicating which currently displayed item can be selected, and a highlighted item flashes at least one time when the highlighted item is selected.

A context-sensitive symbol 306 is presented on the display 208 when a context-sensitive menu is available for a highlighted item. In the illustrated embodiment, the context-sensitive symbol 306 is the letter M. The context-sensitive symbol 306 is a dynamic icon that only appears on highlighted items when a context-sensitive menu is available for the highlighted item. If the user presses one of the plurality of input keys 206, here MENU key 207, a menu icon is presented on the display 208, and the display will update to show a list of actions that relate to the previous highlighted option. The use of the letter M as the context-sensitive symbol 306 is an effective method of indicating to the user that pressing the MENU input key 207 will cause the display 208 to present more options. In addition, use of the context-sensitive symbol 306 provides for efficient use of display pixels and still allows soft-key labels to be presented in the display 208. An exit function soft-key label 310 is presented in a first corner 312 of the display 208, and a select function soft-key label 314 is presented in a second corner 316 of the display 208.

A dynamic scroll indicator 308 having multiple embodiments is presented on the display 208 to indicate possible scrolling directions. In the illustrated embodiment, the dynamic scroll indicator 308 is presented at a side portion 330 of the display 208. In other embodiments, the dynamic scroll indicator 308 can be presented at different locations on the display 208. In addition, in the illustrated embodiment, the title message 300 has a right horizontal line 332 extending from a right side of the title message 300 and a left horizontal line 334 extending from a left side of the title message. When the title message 300 is displayed, the dynamic scroll indicator 308 is a downward pointing arrow with a down-arrow tail 336 coupled to the left horizontal line 334 of the title message 300.

When any of the various information lists currently displayed contains more lines of information than can be presented on the display at one time, the dynamic scroll indicator 308 has multiple appearances depending upon what portion of any of the various lists is currently presented on the display 208. For example, when the title message 300 is displayed (FIG. 3A), the dynamic scroll indicator 308 is a downward pointing arrow to indicate that the possible scrolling direction is down. The user can press the down input key to access another portion of the currently displayed list. Note that in FIG. 3A, the last currently displayed item 320 is not highlighted for selection.

Figure 3B:
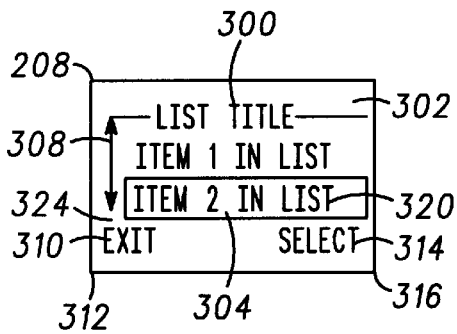

FIG. 3B shows how the highlighter 304 can be moved at a smooth scroll rate when the title message 300 is displayed and the last currently displayed 320 item is not highlighted. The user can hold depressed the down input key 233 to sequentially highlight a next currently displayed item 320. Since in the example shown in FIG. 3B only two items are currently displayed, pressing the down input key 233 will cause the highlighter 304 to move down and highlight the last currently displayed item 320, as shown. The user can press the up input key to sequentially highlight a previous currently displayed item. Note that for the last currently displayed item 320, a context sensitive menu does not exist, so the context-sensitive symbol 306 does not appear on the display 208 when the last currently displayed item is highlighted.

Note that since the next currently displayed item 320 is highlighted, the dynamic scroll indicator 308 is an arrow that points both up towards the top portion 302 of the display 208 and down towards the bottom portion 324 of the display 208 in order to indicate that possible scrolling directions are both up and down. When the dynamic scroll indicator 308 indicates that the possible scrolling directions are up and down, the title message 300 is displayed, and the last currently displayed item is highlighted, pressing the up input key 231 will cause the highlighter 304 to move the highlighter vertically towards the top portion 302 of the display 208 to highlight a previous currently displayed item.

When the title message 300 is displayed and the last currently displayed item 320 is highlighted, as shown in FIG. 3B, the user can hold depressed the down input key 233 to cause the currently displayed items to scroll vertically upward across the display 208 with top-most displayed item scrolling off of the top portion 302 of the display 208 and new items scrolling onto the display 208 from a bottom portion 324 of the display 208. The items scroll at a smooth scroll rate. When the currently displayed items scroll at the smooth scroll rate, the currently displayed scrolling items are substantially readable.

Figure 3C:
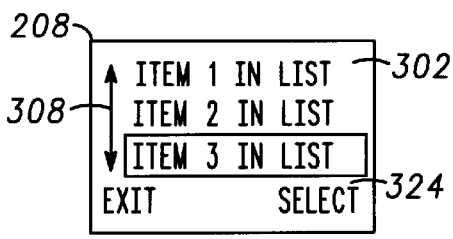
Figure 3D:
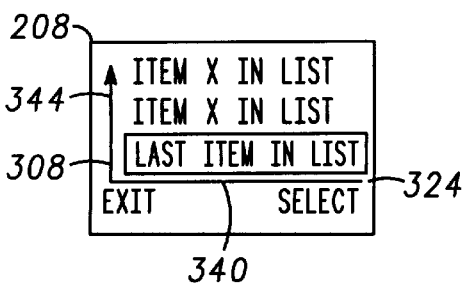

FIG. 3D exemplifies how a bottom portion of any of the various lists is presented on the display 208. An end-of-list indicator 340 is presented at a bottom portion 324 of the display 208 when a bottom portion of any of the various lists is presented on the display 208. When the end-of-list indicator 340 is displayed, the dynamic scroll indicator 308 is an upward pointing arrow to indicate that the possible scrolling direction is up. In the illustrated embodiment, the end-of-list indicator is a horizontal line, and when the end-of-list indicator is displayed, the dynamic scroll indicator 308 is an upward pointing arrow with an up-arrow tail 344 that is coupled to the horizontal line.

FIG. 3C exemplifies how a middle portion of any of the various lists is presented on the display 208. When the title message 300 and the end-of-list indicator 340 are not displayed, the dynamic scroll indicator 308 is an arrow that points both up towards the top portion 302 of the display 208 and down towards the bottom portion 324 of the display 208 in order to indicate that possible scrolling directions are both up and down. When the dynamic scroll indicator 308 indicates that the possible scrolling directions are up and down, the user can hold depressed the down input key 233 (FIG. 2) to cause currently displayed items to scroll upward across the display 208 at the smooth scroll rate, and the user can hold depressed the up input key 231 to cause the currently displayed items to scroll downward across the display 208 at the smooth scroll rate. Thus, the dynamic scroll indicator is an arrow that points both up towards the top portion of the display and down towards the bottom portion of the display to indicate that the possible scrolling direction is up and down when any of a) the title message is displayed and an item subsequent to the first item is highlighted, or b) when the title message and the end-of-list indicator are not displayed.

For extremely small radiotelephone displays, implementing a highlighter which moves up and down a list requires that each line of text has an additional two rows of pixels. If a line of text is seven pixels high, a text line would require nine pixels in order for the highlighter not to overlap the edges of the text. A three line list would thus require twenty-seven rows of pixels. To minimize this effect, in an alternative embodiment the highlighter is located at a center portion of the radiotelephone display and is not scrollable.

Figure 4:
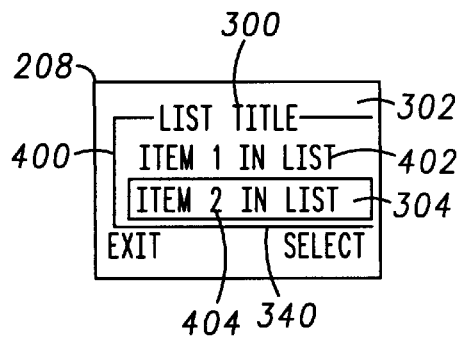
FIG. 4 shows how any of the various lists are presented on the radiotelephone display when all items within the list can be presented on the radiotelephone display at one time.

FIG. 4 is shows how any of the various lists are presented on the display 208 when all items in the list can be presented on the display 208 at on time. In this instance, the title message 300 is presented at the top portion 302 of the display 208. The static scroll indicator 400 is a static vertical line coupled to the title message 300, and the end-of-list indicator 340 is coupled to the static scroll indicator 400. The user can press the down input key 233 to highlight a next currently displayed item 404 or press the up input key 231 to cause the highlighter 304 to move up and highlight the previous currently displayed item 402.

Figure 5:
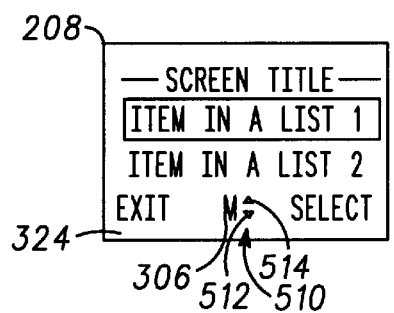
FIG. 5 is an example of a radiotelephone display utilizing the enhanced GUI with a miniature dynamic scroll indicator to compensate for a limited display area.

FIG. 5 is an example of a radiotelephone display utilizing a miniature dynamic scroll indicator. On some radiotelephone displays for non-Latin based characters, the amount of pixels per line limits the amount of graphic feedback than can be presented along a side portion of the radiotelephone display. An example of this is with Chinese characters that require 16×16 pixels per character as compared to 5×7 pixels for Latin-based characters. This makes it difficult to present a dynamic scroll indicator at the side portion of the radiotelephone display. On these types of radiotelephone displays, it is necessary to provide feedback to users that they have the ability to scroll. To compensate for those situations, the dynamic scroll indicator is a miniature dynamic scroll indicator 510.

The miniature dynamic scroll indicator 510 is an up arrowhead 514 when the possible scrolling direction is up, the miniature dynamic scroll indicator 510 is a down arrowhead 512 when the possible scrolling direction is down, and the miniature dynamic scroll indicator 510 is a down arrowhead 512 and an up arrowhead 514 when the possible scrolling directions are up and down. The miniature dynamic scroll indicator 510 is then positioned on a bottom portion 324 of the display 208, adjacent to the context-sensitive symbol 306.

Figure 6A:
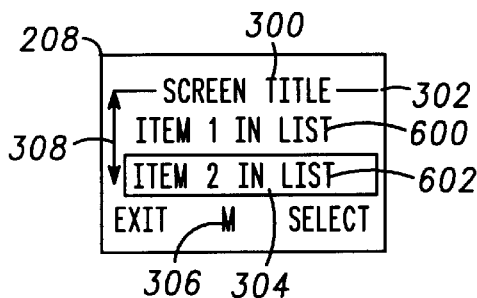
FIGS. 6A–6C exemplifies how currently displayed items scroll across the radiotelephone display at a smooth scroll rate.

FIG. 6 shows in more detail how the currently displayed items scroll across the display 208 at a smooth scroll rate. FIG. 6A shows the top portion of any of the various lists presented on the display 208 with the title message 300 at the top portion 302 of the display 208. The first item of the list 600 and the second item of the list 602 are currently presented on the display 208, and the highlighter 304 is highlighting the second item of the list 602. The only possible scrolling direction for the items here is down, but the highlighter 304 can be scrolled up to highlight the first item of the list 600, so the dynamic scroll indicator 308 is an upward and downward pointing arrow. In addition, since a context sensitive menu is available for the highlighted second item of the list 602, the context-sensitive symbol 306 is appears on the display 208.

Figure 6B:
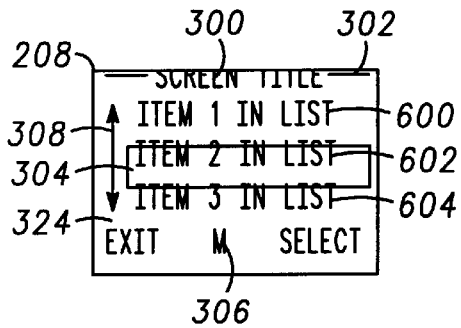

FIG. 6B shows the beginning of the scrolling action when the user holds depressed the down input key 233 (FIG. 2). The currently displayed items scroll vertically upward across the display 208 with title message 300 scrolling off of the top portion 302 of the display 208 and the third item of the list 604 scrolling onto the display 208 from the bottom portion 324 of the display 208. The dynamic scroll indicator 308 changes in appearance to an arrow that points both up towards the top portion 302 of the display 208 and down towards the bottom portion 324 of the display 208. The items scroll at the smooth scroll rate so that the currently displayed items are substantially readable during the scrolling action.

Figure 6C:
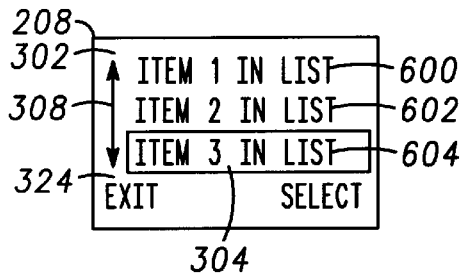

FIG. 6C shows when the third item of the list 604 is completely highlighted by the highlighter 304 and thus available for selection. At this point, if the user releases the down input key 233 (FIG. 2), the scrolling will stop. If the user keeps the down input key 233 depressed, the scrolling will continue with the first item of the list 600 scrolling off of the top portion 302 of the display and the next item of the list scrolling onto the display 208 from the bottom portion 324 of the display. Since in this example the third item of the list 604 does not have an associated context-sensitive menu, the context-sensitive symbol 306 is not presented on the display 208.

Smooth scrolling in the opposite direction, when the user holds depressed the up input key 231 (FIG. 2), is similar to the smooth scrolling exemplified in FIG. 6. When the user holds depressed the up input key 231, the bottom-most displayed item scrolls off of the bottom portion 324 of the display 208, and a new item scroll onto the display 208 from the top portion 302 of the display 208.

In addition, the user can step through the items within any of the various lists by pressing the up input key 231 and the down input key 233 and then releasing the input keys rather than holding them depressed. For example, by pressing and then releasing the down input key, the items in the list will scroll one item up, with the top-most displayed item scrolling off of the top portion 302 of the display 208, and a new item appearing from the bottom portion 324 of the display 208.

The various lists that are presented on the display can also include items that comprise multi-line text fields. For example, a multi-line text field can be a message that is received by the radiotelephone, a multi-line description or instruction (such as a help instruction on how to operate a feature of the radiotelephone), or a set of information about a person (such as multi-line personal information about someone accessed through the phonebook option). The enhanced list display format can also be used to present the multi-line text fields.

FIG. 7 exemplifies how a multi-line text field can be presented on the display 208. For instance, the user may have been displaying a list of selectable items, and the user then selected "received messages." FIG. 7A is the display of the first received message. The title message 300 corresponding to the first received message is presented at the top portion 302 of the display 208. Since the top portion of the first received message is displayed, the dynamic scroll 308 indicator is a downward pointing arrow to indicate that the possible scrolling direction is down. The first line of text 700 and the second line of text 702 are also presented on the display 208.

In the illustrated embodiment, there is no highlighter presented on the display for the first received message. Some other multi-line text fields can have further selectable items so that a highlighter would be presented on the display to highlight at least a portion of the multi-line text field.

Figure 7A:
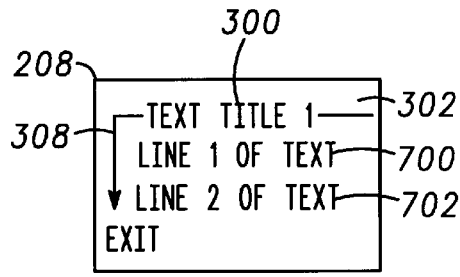
FIGS. 7A–7D exemplifies how a multi-line text field can be presented on the radiotelephone display.
Figure 7B:
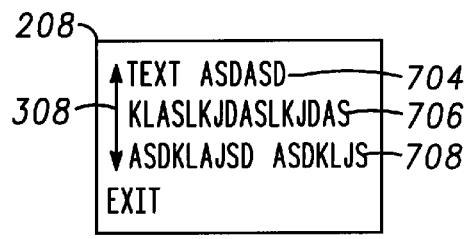

FIG. 7B shows that if the user presses the down input key 233, the lines of text scroll across the display to reveal more lines of text, and the dynamic scroll indicator 308 now changes in appearance to indicate that possible scrolling directions are both up and down. If the user holds the down input key 233 depressed, the title message and the lines of text will vertically scroll off of the display 208 at the smooth scroll rate so that a third line of text 704, a fourth line of text 706, and a fifth line of text 708 are presented on the display 208.

Figure 7C:
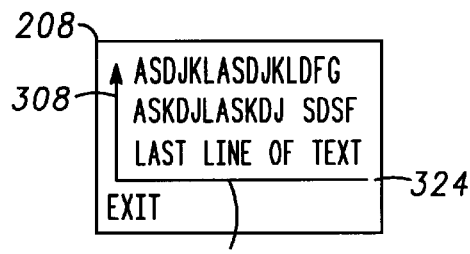

FIG. 7C shows that after future scrolling a bottom portion of the first received message is reached. The dynamic scroll indicator 308 changes in appearance to indicate that the possible scrolling direction for the first received text message is up, and the end-of-list indicator 340 is presented at a bottom portion 324 of the display 208.

An experienced radiotelephone user will know that the next received message can be quickly accessed by pressing the down input key 233 even though the dynamic scroll indicator 308 indicates that the possible scrolling direction is up. In this instance, the dynamic scroll indicator 308 is indicating possible scrolling directions for the multi-line text field that is currently being displayed (e.g. the first received message). Thus, if the user presses the down input key 233 while the end-of-list indicator 340 is presented for the first received message, the display will scroll to the second received message.

Figure 7D:
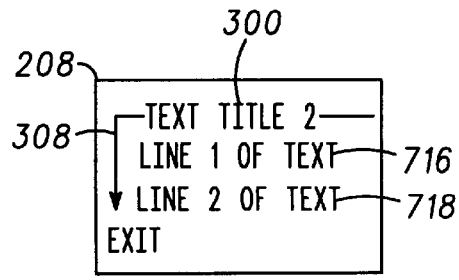

FIG. 7D shows the title message 300 is now the title of the second received message, and the first line of text 716 and the second line of text 718 for the second received message are presented on the display 208. The dynamic scroll indicator 308 once again changes in appearance to indicate that possible scrolling direction is down. If the user presses the up input key 231 here, the display will change to what is presented in FIG. 7C.

The enhanced GUI also has a page next/previous function so that the user can press a next input key 290 (FIG. 2) to cause a page down to a next set of information, or the user can press a previous input key 292 (FIG. 2) to cause a page up to a previous set of information. The page next/previous function allows the user to scroll through information at a faster rate than the normal scrolling at the smooth scroll rate. In the illustrated embodiment, the next input key 290 (FIG. 2) and the previous input key 292 (FIG. 2) are shown to be two of the plurality of input keys 206 (FIG. 2). It will be obvious to those skilled in the art that other of the plurality of input keys 206 or even a different set of input keys can be used to function as the next input key and the previous input key.

Figure 8A:
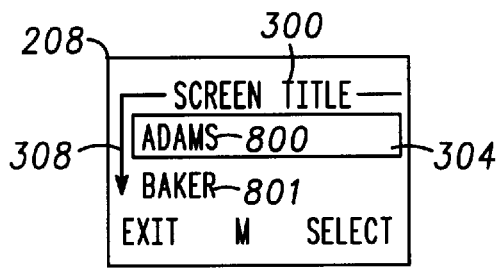
FIGS. 8A–8C exemplifies an expert search function of the enhanced GUI.

FIG. 8 exemplifies a search function, which is used in conjunction with the dynamic scroll indicator 308. The search function is an expert feature that allows a more experienced user to quickly navigate through the items of a list to search for a particular item. The search function allows a user to press an input key corresponding to a desired letter to cause a currently displayed list to automatically jump to a first item of the currently displayed list that begins with the desired letter and then display and highlight the first item of the currently displayed list that begins with the desired letter. For example, in FIG. 8A, the title message 300 is presented on the display 208 for a particular list. The list is a phone list with each item being a name associated with a telephone number that has been stored in the memory 112. The dynamic scroll indicator 308 indicates that the possible scrolling direction is down, and the highlighter 304 is highlighting the first item of the list 800.

In the illustrated embodiment, the first item of the list 800 is the name "ADAMS" and begins with the letter A. Thus, the items in the list are organized in alphabetical order, with the second item in the list 801 being "BAKER." If the user desires to find the telephone number of person or entity that has a first letter in the representative name that begins with the letter "T", the user just presses one of the plurality of input keys 206 that corresponds to the letter T (usually the number 8 input key on standard telephone keypad layouts).

Figure 8B:
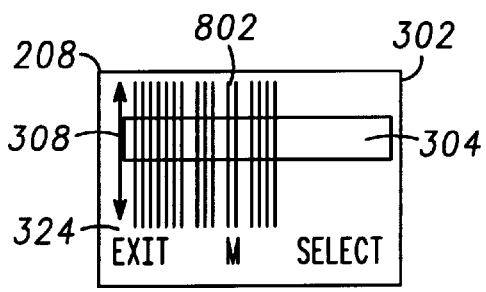

As shown in FIG. 8B, when the letter T is entered, the highlighter 304 remains fixed, but the the items presented on the display 208 vertically scroll up, towards the top portion 302 of the display 208 at the fast scroll rate while new items scroll onto the display 208 from the bottom portion 324 of the display 208. The fast scroll rate is a faster scrolling speed than the smooth scroll rate, and during the fast scroll rate, the currently displayed scrolling items are substantially not readable, so that the currently displayed scrolling items appear as a stream of moving pixels 802. In FIG. 8B, the stream of moving pixels 802 are vertically scrolling up off of the top portion 302 of the display 208 in order to give the user a sense as to which direction the scrolling at the fast scroll rate is occurring.

Figure 8C:
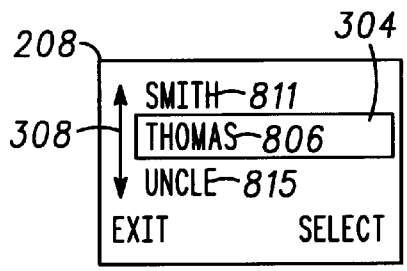

FIG. 8C shows the display after the first item in the list that begins with the letter T is found. The highlighter 304 highlights the first item in the list that begins with the letter T, here an item THOMAS 806. Note that a preceding item SMITH 811, which is the last item in the list that begins with the letter S, is also displayed. In addition, the first item that begins with the letter U, here item UNCLE 815, is also displayed. If no item beginning with the letter T existed in the list, then entering T would have caused the list to scroll to the first item beginning with the letter U.

In a similar manner, if the user enters a letter that alphabetically precedes the first letter of the currently highlighted item, the highlighter 304 will remain fixed, but the the items presented on the display 208 vertically scroll down towards the bottom portion 324 of the display 208 at the fast scroll rate while new items scroll onto the display 208 from the top portion 324 of the display 208 until the first item in the list that begins with the entered letter is found and highlighted.

Figure 16:
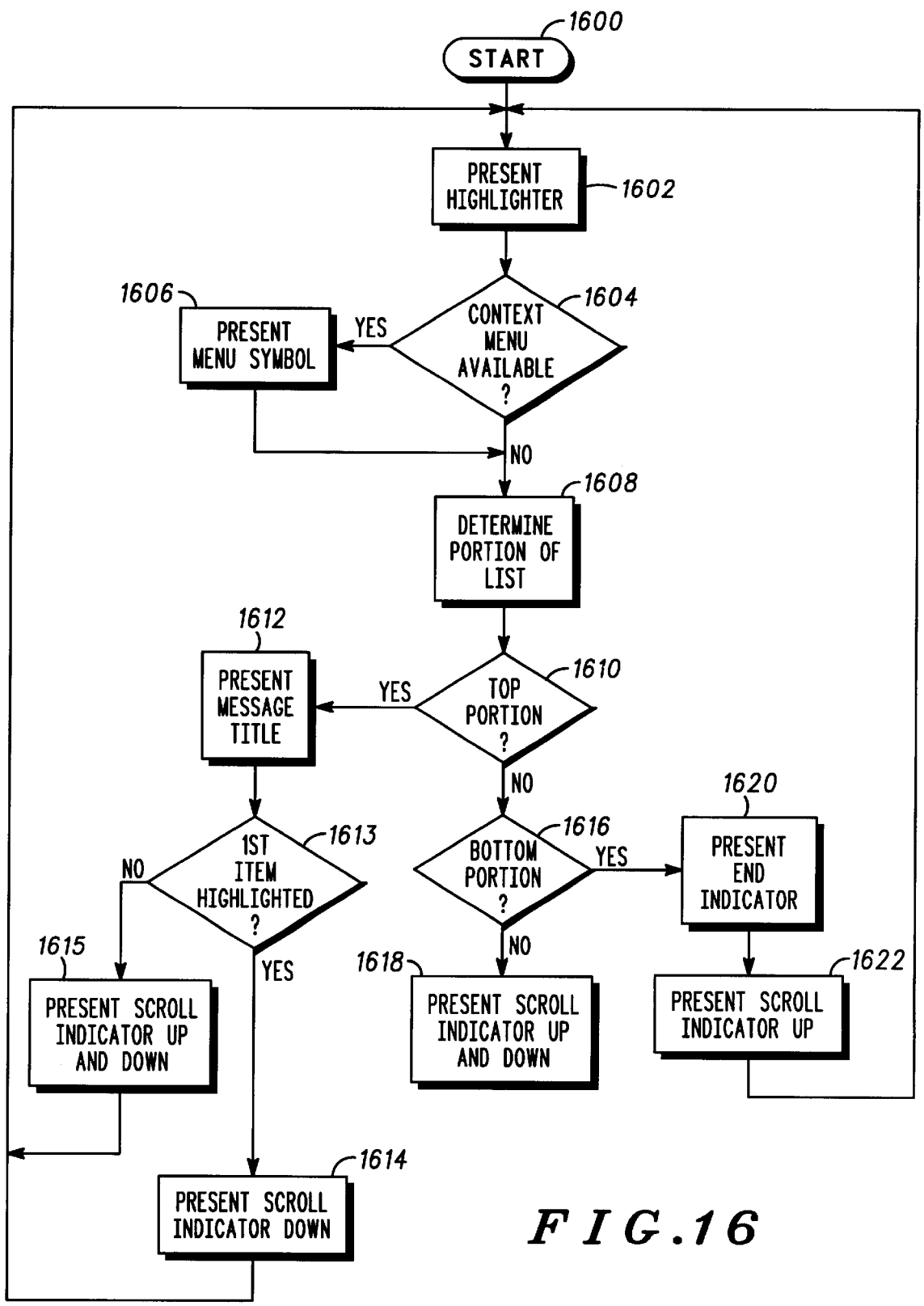
FIG. 16 is a flowchart illustrating a method of presenting various lists on a radiotelephone display.

FIG. 16 is a flowchart illustrating a method of presenting various lists on the display 208. The method starts at block 1600, and at block 1602 a highlighter is presented on the radiotelephone 200. At decision block 1604 it is determined whether a context-sensitive menu exists for a highlighted item. If a context-sensitive menu does exist, then at block 1606 the context-sensitive symbol 306 (FIG. 3) is displayed.

At block 1608 it is determined whether one of a top portion, a middle portion, and a bottom portion 324 of any of the various lists is currently presented on the display 208.

If at decision block 1610 it is found that the top portion of any of the various lists is presented, then at block 1612 the title message 300 is presented on the display 208. If at decision block 1613 it is found that a first item is highlighted, then at block 1614 the dynamic scroll indicator 308 is presented on the display 208 to indicate that the possible scrolling direction is down. If at decsision block 1613 it is found that an item subsequent to the first item is highlighted, then at block 1615 the dynamic scroll indicator 308 is presented on the display to indicate that possibe scrolling directions are up and down.

If at decision block 1610 it is found that the top portion of any of the various lists is not presented, then at decision block 1616 it is determined whether a bottom portion of any of the various lists is presented on the display 208.

If the bottom portion is presented, then, at block 1620 the end-of-list indicator 340 is presented. At block 1622 the dynamic scroll indicator 308 is presented on the display 208 to indicate that the possible scrolling direction is up.

If it is found at decision block 1616 that the bottom portion of any of the various lists is not presented, thereby indicating that the middle portion of any of the various lists is presented on the display 208, then at block 1618 the dynamic scroll indicator 308 is presented on the display to indicate that possibe scrolling directions are up and down.

When the user wishes to enter information (such as text or numeric date entry) into the radiotelephone, the enhanced GUI has several features to allow efficient and intuitive entry of the information. The controller 106 (FIG. 1) causes the display 208 (FIG. 2) to present various infomation (or alternatively data) entry screens having unique characteristics to serve specific data entry modes, and the display individually presents the screens depending upon the available information entry options.

Internal testing has shown that the incorporation of the title message 300, the end-of-list indicator 340, and the dynamic scroll indicator dramatically increases the ability of a user to efficiently and easily navigate through various lists and text fields that are presented on the display 208. The changing appearance of the dynamic scroll indicator provides visual feedback to the user to constantly remind him what the possible scrolling directions are at all times.

The search function at the fast scroll rate provides an expert feature that allows greater functionality of the GUI as a user becomes more experienced. The flow of pixels to give a sense of direction during the search function scrolling helps orient the user and makes him feel more comfortable as he is using the system. The moving pixels during the fast scroll rate is a type of visual feedback to let the user know that an input has been registered and is being acted upon.

The GUI also comprises information entry screens for entering information to the radiotelephone. The type of information entry screen presented is dependant upon what kind of information is being entered and whether any selectable information is available for a particular information entry screen. For the information entry screens, the controller causes the display to individually present an editor screen, an editor-with-list screen sequence, a set value list screen sequence, a form screen sequence, and a toggle value screen sequence.

Figure 9A:
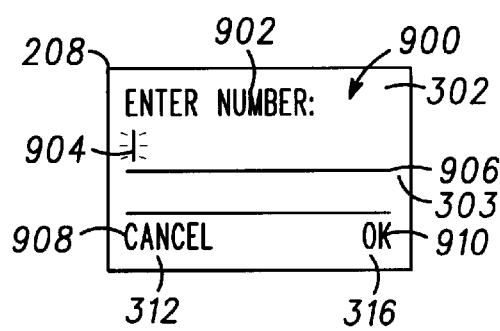
FIGS. 9A–9B exemplifies the editor screen for entering input information.

FIG. 9 exemplifies the editor screen 900 for individually entering each character of a single field of desired input information. As shown in FIG. 9A, the editor screen 900 has a prompt message 902 at a top portion 302 of the display 208, at least one horizontal line 906 in a middle portion 303 of the display 208 for presenting input information, a cancel function soft-key label 908 in a first corner 312 of the display 208, and an ok function soft-key label 910 in a second corner 316 of the display 208. A cursor 904 is presented on the at least one horizontal line 906 to indicate where entered information will appear on the display 208. In the preferred embodiment, the cursor 904 flashes.

The cancel function soft-key label 908 corresponds to one of the plurality of input keys 206 (FIG. 2) that can be pressed to exit from the editor screen 900 if the user decides not to continue with the specific input information. It will be obvious to those skilled in the art that the cancel function soft-key label 908, as well as all other function soft-key labels of the exhanced GUI, can be assigned different names without use of the inventive faculty. For example, the cancel function soft-key label 908 could be replaced with an exit function soft-key label to terminate the editor screen 900. The ok function soft-key label 910 corresponds to another input key of the plurality of input keys 206 (FIG. 2) and is for selection when input information entry is complete and ready for processing.

Figure 9B:
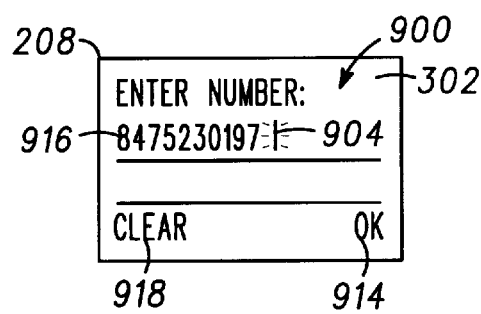

FIG. 9B shows how the editor screen 900 presents information as it is entered. The cancel function soft-key label changes to the clear function soft-key label 918 after at least some of the each character of the single field of the desired input information 916 is entered. Thus, if a user decides to erase or change his input, hitting the clear input key (e.g. a specific one of the plurality of input keys 206) will cause any displayed input information 916 to be erased from the at least one horizontal line 906. When the input of information is complete, the user selects the ok input key to process the input information 916.

The editor screen 900 can serve many different information input functions. For example, it can serve as an idle editor for entering numeric digits, a name editor for entering names, a text editor for entering text, and a security editor for entering personal identification numbers, etc. The display will present an '*' for each character of secure information that is entered. Thus, the prompt message 902 can be different depending upon which type of input information is being entered. For example, when the editor screen 900 is serving as an idle editor for entering numeric digits, the prompt message 902 prompts the user for a number. Alternatively, when the editor screen 900 is serving as name editor, the prompt message 902 will prompt the user to enter a name.

FIG. 10 exemplifies the editor-with-list screen sequence entering input information. The editor-with-list screen sequence gives the user a choice for entering input information manually or by selecting the input information from a list. As seen in FIG. 10A, the editor-with-list screen sequence begins by having the prompt message 902 at the top portion 302 of the display 208, the at least one horizontal line 906 in the middle portion 303 of the display 208, the cancel function soft-key label 908 in the first corner 312 of the display 208, and a list function soft-key label 1000 in the second corner 316 of the display 208.

Figure 10A:
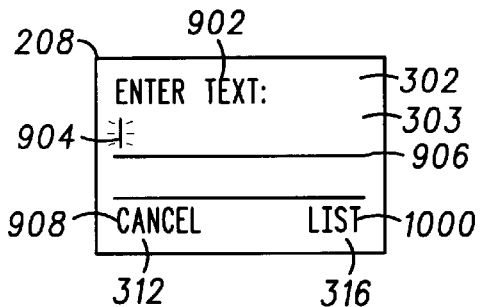
FIGS. 10A–10D exemplifies the editor-with-list screen sequence for entering input information.
Figure 11A:
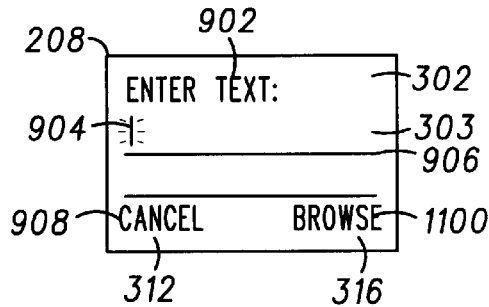
Figure 10B:
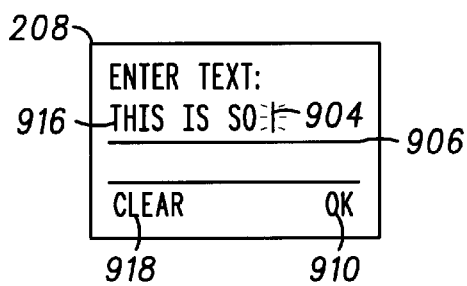

FIG. 10B exemplifies what happens if the user enters the input information manually. As in the editor screen 900 of FIG. 9, here the cancel function soft-key label 908 changes to the clear function soft-key label 918, the list function soft-key label 1000 changes to the ok function soft-key label 910, and the input information 916 is printed on the at least one horizontal line 966.

If the list function soft-key label 1000 of FIG. 10A is selected, the prompt message 902 changes to a list title 1020, an information list 1022 with a dynamic scroll indicator 308 replaces the at least one horizontal line 906, and the list function soft-key label 1000 is replaced by a select function soft-key label 314. The user is then able to scroll through the information list 1022 for selection of the desired input information.

Figure 10D:
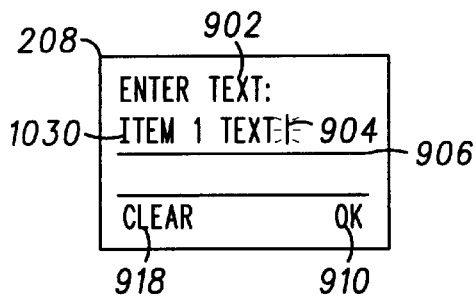

After the users makes a selection, FIG. 10D shows that the prompt message 902 replaces the list title 1020, and the at least one horizontal line 906 replaces the information list 1022 and the dynamic scroll indicator 308 so that selected input information 1030 is printed on the at least one horizontal line 906. In addition, the clear function soft-key label 918 replaces the cancel function soft-key label 908, and the ok function soft-key label 910 replaces the select function soft-key label 314. The ok function soft-key label 910 is for selection when input information entry is complete and ready for processing, while the clear function soft-key label 918 is for entering the selected input information 1030.

FIG. 11 shows how the editor-with-list screen sequence can have more than one information list to choose from, so that the user can first browse through a plurality of list titles presented on the display 208 and choose a desired infomation list, and then the desired information list is presented on the display 208 for selecting the single field of the desired input information from the information list stored in the memory 112. As seen in FIG. 11A, the editor-with-list screen sequence first has the prompt message 902 at the top portion 302 of the display 208, the at least one horizontal line 906 in the middle portion 303 of the display 208, the cancel function soft-key label 908 in the first corner 312 of the display 208, and a BROWSE function soft-key label 1160 in the second corner 316 of the display 208. If the user elects to enter input information manually, then as shown in FIG. 10B, the cancel function soft-key label 908 changes to the clear function soft-key label 918, the BROWSE function soft-key label 1100 changes to the ok function soft-key label 910, and the input information 916 is printed on the at least one horizontal line.

Figure 11B:
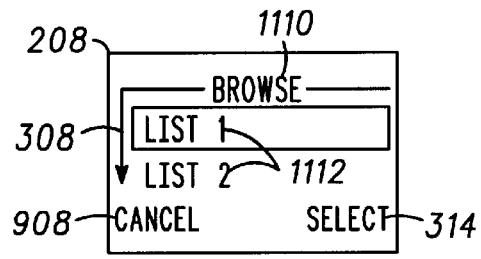
Figure 10C:
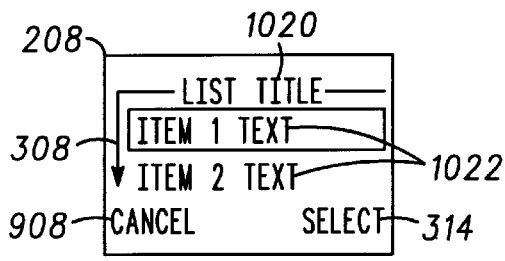

If, however, the BROWSE function soft-key label 1100 is selected, then as shown in FIG. 11B, the prompt message 902 changes to a browse title 1110, a browse list 1112 with the dynamic scroll indicator 308 replaces the at least one horizontal line 906, and the select function soft-key label 314 replaces the BROWSE function soft-key label 1100. The user is then able to scroll through the browse list 1112 to select the input information list.

Figure 11C:
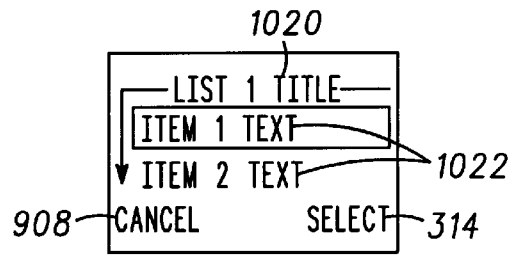

As seen in FIG. 11C, after the user selects the input information list, the list title 1020 replaces the browse title 1110, and the information list 1022 replaces the browse list 1112 so that the user can select the desired input information.

Figure 11D:
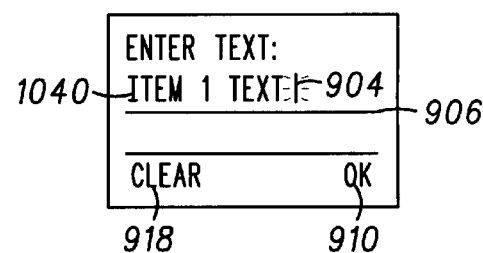

FIG. 11D shows that after the user selects the input information, the prompt message 902 replaces the list title 1020, the at least one horizontal line 906 replaces the information list 1022 and the dynamic scroll indicator 308 so that selected input information 1040 is printed on the at least one horizontal line 906. The clear function soft-key label 918 replaces the cancel function soft-key label 908, and the ok function soft-key label 910 replaces the select function soft-key label 314.

FIG. 12 shows a set value list screen sequence for entering one of a plurality of radiotelephone operation settings that are stored in the memory 112. FIG. 12A shows a first set value screen 1200 has a setting prompt message 1202 followed by a current value 1204, an exit function soft-key label 310 in the first corner 312 of the display 208, and a change function soft-key label 1206 in the second corner 316 of the display 208. The current value 1204 is changeable by pressing a first input key 207 and a second input key 209 to cycle through different values. On some radiotelephones, the first input key 207 corresponds to the key marked with the '*' symbol. The first input key 207 might also have an arrow marking that points to a first sideways direction. Also, on some radiotelephones, the second input key 209 corresponds to the key marked with the '#' symbol. The second input key might also have an arrow marking that points to a second sideways direction.

Therefore, the first input key 207 and the second input key 209 can be used to sideways scroll through the several possible values to change the current value. As the user scrolls through the several possible values, the current value 1204 that is presented on the display to show the current value 1204 that is currently active.

Figure 12A:
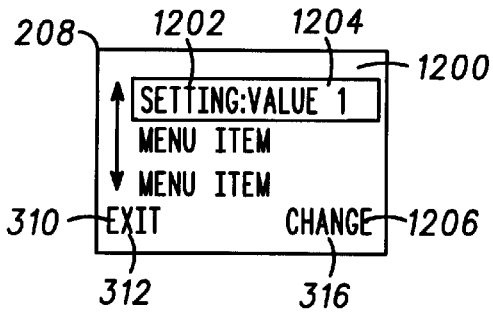
FIGS. 12A–12E shows a set value list screen sequence for entering telephone settings that have several possible values.
Figure 12E:
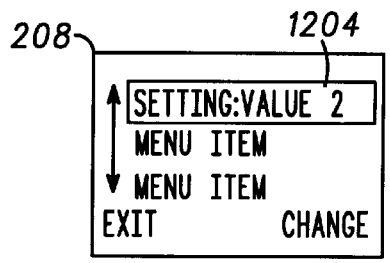
Figure 12B:
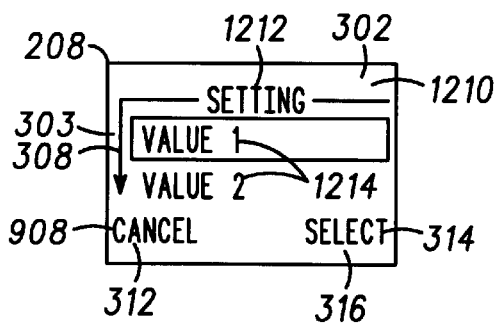

FIG. 12B shows how the current value can be changed by using the change function soft-key label 1206. The change function soft-key label corresponds to one of the plurality of input keys, here input key 211. When the change function soft-key label 1206 is used, the controller 106 causes the display 208 to replace the first set value screen 1200 with a second set value screen 1210 having a setting title 1212 at the top portion 302 of the display 208, a value list 1214 with the dynamic scroll indicator 308 in the middle portion 303 of the display 208, the cancel function soft-key label 908 in the first corner 312 of the display 208, and select function soft-key label 314 in the second corner 316 of the display 208. The user can thus scroll through different possible values to choose a desired setting value.

Figure 12C:
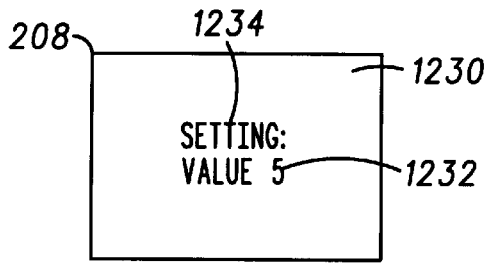

FIG. 12C shows what happens after a desired value is highlighted and the select function soft-key label 314 is selected. The controller 106 (FIG. 1) causes the display 208 to replace the second set value screen 1210 with a third set value screen 1230 having the current value that is selected 1232 momentarily presented on the display 208. A message 1234 indicates what value is being momentarily presented. The predetermined period of time can be on the order of one second to ten seconds.

Figure 12D:
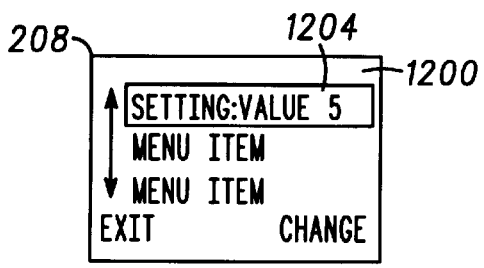

FIG. 12D shows that after the current value that is selected 1232 is presented on the display 208 for a predetermined period of time, the controller 106 causes the display 208 to present the first set value screen 1200. The current value that is selected 1232 is not presented as the current value 1204.

FIG. 12E shows how the current value 1204 of the set value list screen sequence is also changeable from the first set value screen 1200 by entering a new value directly. The new value can be entered directly by pressing one of the plurality of input keys corresponding to the desired new value. For example, in FIG. 12E the desired new value is two, so the user presses an input key corresponding to the number two, and the current value 1204 is updated. This entering of the new current value directly is a shortcut method for more advanced users.

FIG. 13 shows that the various information entry screens further comprises a toggle value screen sequence for entering radiotelephone settings that can also be toggled between on and off. FIG. 13A shows that the display 208 presents a first toggle value screen 1300 that has a setting prompt message 1202, the exit function soft-key label 310 in the first corner 312 of the display 208 and the change function soft-key label 1206 in the second corner 316 of the display 208.

Figure 13A:
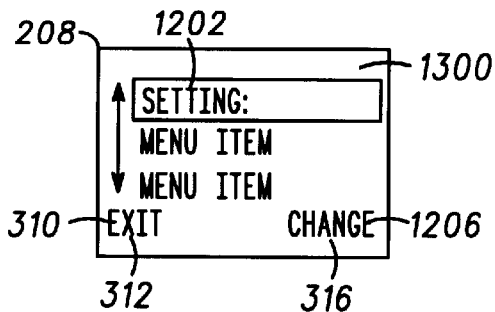
FIGS. 13A–13E shows that the various information entry screens further comprises a toggle value screen sequence for setting values that can also be toggled between on and off.
Figure 13E:
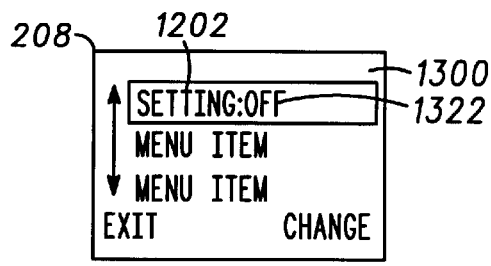
Figure 13B:
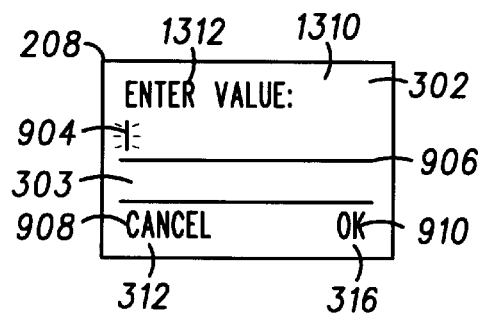

FIG. 13B shows that after the user selects an input key corresponding to the change function soft-key label 1206, the display 208 presents a second toggle value screen 1310 having an enter value prompt 1312 at the top portion 302 of the display 208, the at least one horizontal line 906 in the middle portion 303 of the display 208, the cancel function soft-key label 908 in the first corner 312 of the display 208, and the ok function soft-key label 910 in the second corner 316 of the display 208. The user can then manually enter the current value. As the user manually types the current value using the plurality of input keys 206, the current value is displayed on the at least one horizontal line 906.

Figure 13C:
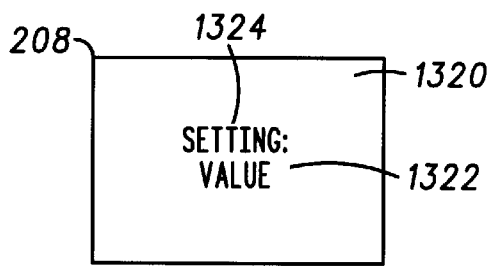

FIG. 13C shows that after the user selects an input key corresponding to the ok function soft-key label 910, the controller 106 causes the display 208 to replace the second toggle value screen 1310 with a third toggle value screen 1320 having the current value that is entered momentarily presented on the display 208 along with a heading 1324.

Figure 13D:
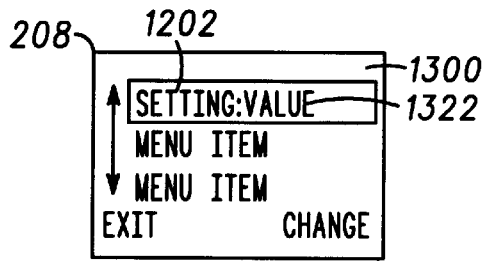

FIG. 13D shows that after the current value 1322 is presented on the display 208 for a predetermined period of time, the controller 106 causes the display 208 to present the first toggle value screen with the current value 1322 appearing adjacent to the setting prompt message 1202.

FIG. 13E then shows that the current value 1322 displayed on the first toggle value screen 1300 can be toggled between on and off by pressing the first input key 207 and the second input key 209. When the current value 1322 is toggled on, the current value 1322 is presented adjacent to the setting prompt message 1202. When the current value 13422 is toggled off, a word off is presented adjacent to the setting prompt message 1202 to indicate that the setting is not active.

FIG. 14 shows that the various information entry screens further comprises a form screen sequence for entering multiple fields of input information that make up a single data object. FIG. 14A shows that the display 208 presents a first form screen 1400 having a form title 1402 at the top portion 302 of the display 208, a plurality of field prompts 1406 with the dynamic scroll indicator 308 in the middle portion 303 of the display 208, the cancel function soft-key label 908 in the first corner 312 of the display 208, and an edit function soft-key label 1410 in the second corner 316 of the display 208. A first one of the plurality of field prompts 1412 is highlighted to indicate that is active for editing.

Figure 14A:
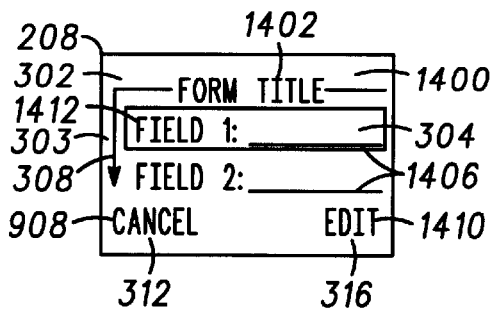
FIGS. 14A–14E shows that the various information entry screens further comprises a form screen sequence for entering multiple fields of input information that make up a single data object.
Figure 14E:
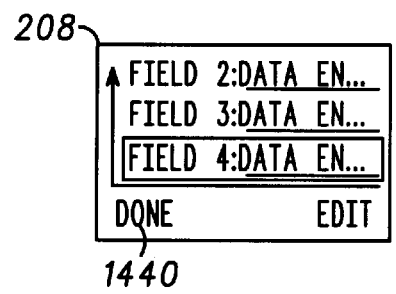
Figure 14B:
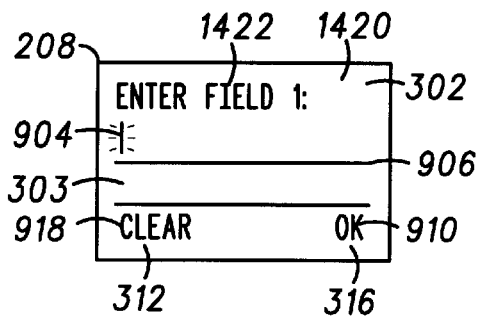
Figure 14C:
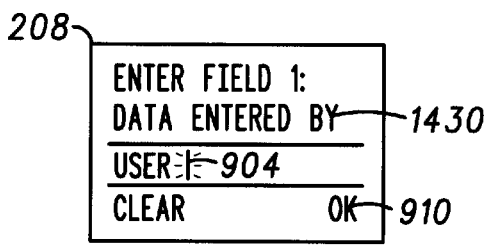

FIG. 14B shows that after the user selects an input key corresponding to the edit function soft-key label 1410 with a first one of the plurality of field prompts 1412 highlighted, the display 208 presents a second form screen 1420 having an enter field prompt 1422 at the top portion 302 of the display 208, the at least one horizontal line 906 in the middle portion 303 of the display 208, the clear function soft-key label 918 in the first corner 312 of the display 208, and the ok function soft-key label 910 in the second corner 316 of the display 208. The second form screen 1420 is for entering a first input string corresponding to the first one of the plurality of field prompts. FIG. 14C shows that as the user manually enters the first input string 1430, the first input string 1430 is displayed on the at least one horizontal line 906.

Figure 14D:
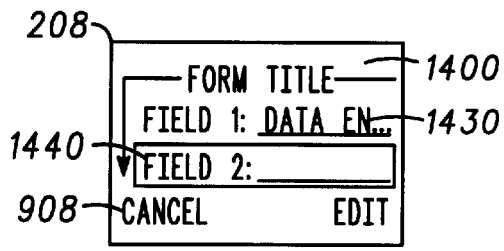

FIG. 14D shows that after the user selects the input key corresponding to the ok function soft-key label 910, the first form screen 1400 replaces the second form screen 1420. At least a portion of the first input string 1430 is presented adjacent to the associated field prompt (here the first one of the plurality of field prompts 1412), and a next one of the plurality of field prompts 1440 is then so that the user can enter another input string from the second form screen. FIG. 14E shows that when field information has been entered for all of the plurality of field prompts for a form, a done function soft-key label 1440 replaces the cancel function soft-key label 908. The user can then press an input key corresponding to the done function soft-key label 1440 to enter the information.

The first form screen 1400 has a dynamic highlighter 304 for highlighting one of the plurality of field prompts that is currently active for entering an input string. The dynamic highlighter 304 sequentially scrolls to the next one of the plurality of field prompts 1440 whenever an input key corresponding to the ok function soft-key label 910 is selected while the second form screen 1420 is presented.

Figure 17:
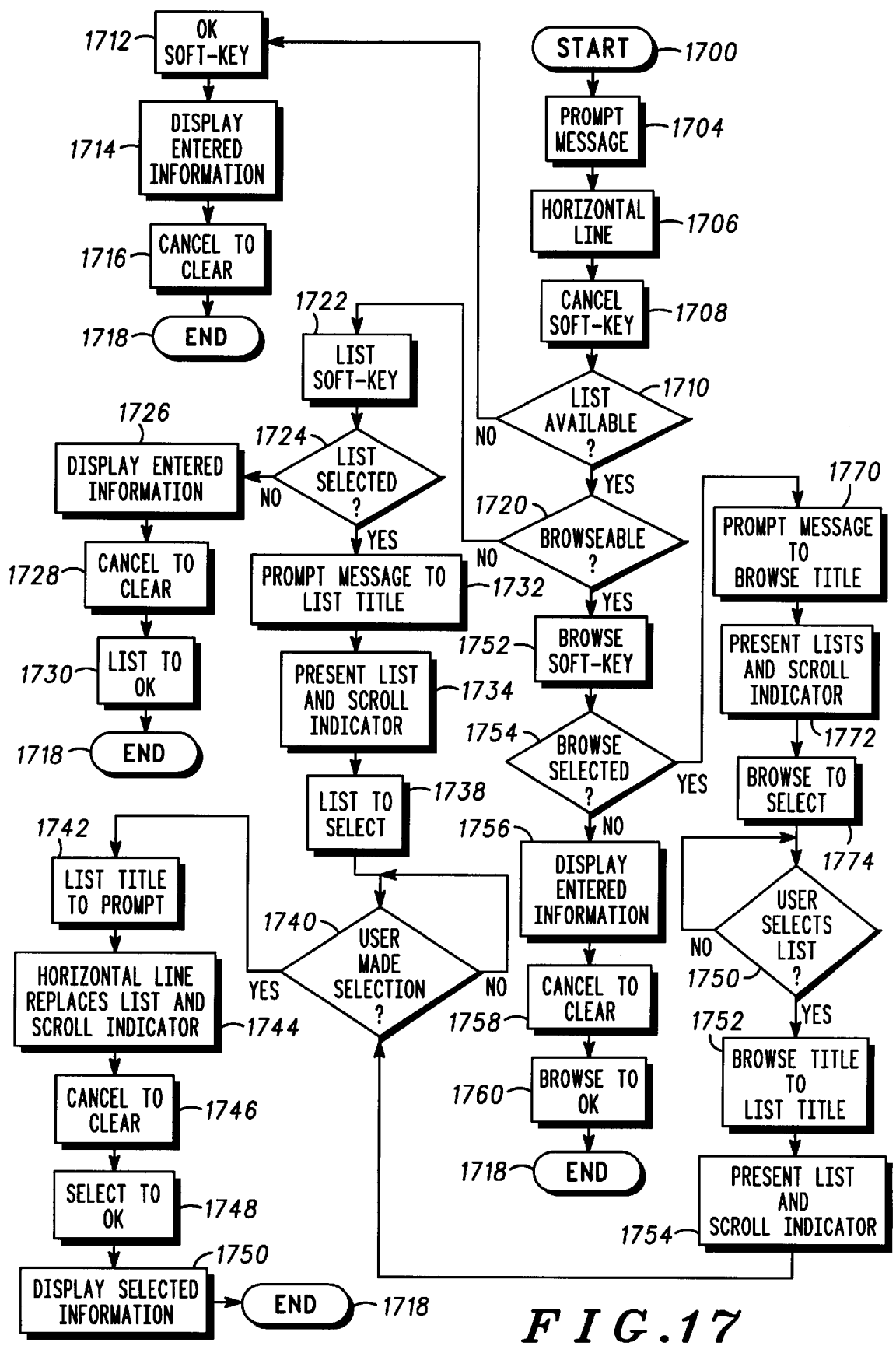
FIG. 17 is a flowchart illustrating a method of presenting various information entry screens for data entry modes.

FIG. 17 is a flowchart illustrating a method of presenting various information entry screens for data entry modes. The method starts at block 1700, and at block 1704 the prompt message 902 (FIGS. 9, 10, and 11) is presented at the top portion 302 of the display 208, and at block 1706 the at least one horizontal line 906 is presented in the middle portion 303 of the display 208. The cancel function soft-key label 908 is presented in the first corner 312 of the display 208 at block 1708.

If at decision block 1710 it is determined that a list of items is not available, then at block 1712 the ok function soft-key label 910 is presented in the second corner 316 of the display 208. At block 1714 manually entered information is presented on the at least one horizontal line 906, and at block 1716 the cancel function soft-key label 908 changes to a clear function soft-key label 918. The method then ends at block 1718 so that the entered information can be processed.

If at decision block 1710 is is determined that a list of items is available and it is determined at block 1720 that a set of browsable lists is not available, then at block 1722 the list function soft-key label 1000 is presented in the second corner 316 of the display 208. If it is determined that the list option is not selected at decision block 1724, then the manually entered information is presented on the at least one horizontal line 906 at block 1726. The cancel function soft-key label 908 is replaced by the clear function soft-key label 918 at block 1728. At block 1730 the list function soft-key label 1000 is replaced by the ok function soft-key label 910. The method then ends at block 1718 so that the entered information can be processed.

At decision block 1724, if it is determined that the list option is selected, then the list title 1020 replaces the prompt message 902 at block 1732. At block 1734 the information list 1022 with the dynamic scroll indicator 308 replaces the at least one horizontal line 906, and at block 1738 the select function soft-key label 314 replaces the list function soft-key label 1000. The user then able to scroll through the information list 1022 for selection.

When it has been determined at decision block 1740 that the user has selected an item, the prompt message 902 replaces the list title at block 1742. At block 1744 the at least one horizontal line 906 replaces the information list 1022 and the dynamic scroll indiator 308, and the clear function soft-key label 918 replaces the cancel function soft-key label 908 at block 1746. At block 1748 the ok function soft-key label 910 replaces the select function soft-key label 314, and the selected information is presented on the at least one horizontal line 906 at block 1750. The method then ends at block 1718 so that the selected information can be processed.

If it is determined at block 1720 that a set of browsable lists is available, then at block 1752 the BROWSE function soft-key label 1100 is presented in the second corner 316 of the display 208. If at decision block 1754 it is determined that the browse option is not selected, then the manually entered information is presented on the at least one horizontal line 906 at block 1756. At block 1758 the clear function soft-key label 918 replaces the cancel function soft-key label 908, and the ok function soft-key label 910 replaces the BROWSE function soft-key label 1100 at block 1760. The method then ends at block 1718 so that the entered infomation can be processed.

If at decision block 1754 it is determined that the browse option is selected, the browse title 1110 replaces the prompt message 902 at block 1770. At block 1772 a browse list 1112 with the dynamic scroll indicator 308 replaces the at least one horizontal line 906, at block 1774 and the select function soft-key label 314 replaces the BROWSE function soft-key label 1100. The user is then able to scroll through the browse list 1112 to select the desired input information list.

When it is determined at decision block 1750 that the user has selected an information list, the corresponding list title 1020 replaces the browse title 1110 at block 1752. At block 1754 the information list 1022 replaces the browse list 1112 so that the user can select the input information.

When it has been determined at decision block 1740 that the user has selected an item, the prompt message 902 replaces the list title at block 1742. At block 1744 the at least one horizontal line 906 replaces the information list 1022 and the dynamic scroll indiator 308, and the clear function soft-key label 918 replaces the cancel function soft-key label 908 at block 1746. At block 1748 the ok function soft-key label 910 replaces the select function soft-key label 314, and the selected information is presented on the at least one horizontal line 906 at block 1750. The method then ends at block 1718 so that the selected information can be processed.

Figure 15:
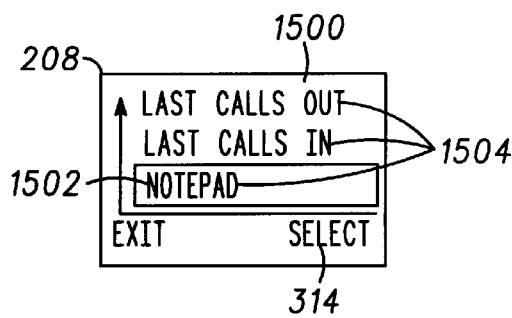
FIG. 15 is an example of how a notepad feature of the enhanced GUI can be accessed.

FIG. 15 is an example of how a notepad feature of the enhanced GUI can be accessed. The notepad contains the most recent strings of user input entries made during one of various radiotelephone states. For example, the controller 106 (FIG. 1) causes the memory 112 (FIG. 1) to store a most recent string of user input entries whenever one of a display 208 time-out occurs, an end input key is pressed during an active call, the radiotelephone 200 is turned off, or the display 208 is manually cleared by a user. Storing the most recent string of user input entries keeps the entries out of the way (minimizing confusion) while still being accessible for later calling or storing of the entries. Thus, when the controller 106 causes the memory 112 to store the most recent string of user input entries, the most recent string of user input entries is erased from the display 208.

The user can retrieve the most recent string of user input entries and produce retrieved notepad data by selecting a notepad option while the radiotelephone 200 is in an entering digits state. The retrieved notepad data is then presented on the display 208 for further processing. Examples of entering digits states include when the radiotelephone 200 is in an idle mode, an active call mode, and an active call with call on hold mode.

For example, the notepad option is a menu selection under a recent calls menu 1500. The user can scroll down the recent calls list 1504 until the notepad option 1502 is highlighted. By pressing an input key corresponding to the select function soft-key label 314, the user can then retrieve the string of user input data.

Generally, the most recent string of user input entries is made by the user entering information to the radiotelephone 200 with the plurality of input keys 206. In addition, the radiotelephone can further comprise a voice recognition feature wherein the most recent string of user input entries is made by the user speaking the input information into the radiotelephone 200.

The enhanced GUI provides many features which significantly aid the user in accessing and entering information through a portable radiotelephone. The method of presenting the various lists is intuitive and thus easier for the user to learn. The various lists presented on the display are also very efficient and thus allow the user to access information faster, which is very important in a mobile environment. The various information entry screens provide the user efficient and intuitive ways to enter information, and they have several modes of operation to allow for streamlined operation for advanced users. Internal testing has shown that the combination of the various information entry screens and the formats used for each of them has made the entering of information and the toggling of radiotelephone settings much more easier for the average user while still providing excellent features for the more experienced user. The notepad feature is an effective way to save quickly entered information without causing the information to confuse or corrupt information that is subsequently entered. The notepad feature also prevents incorrect dialing of a telephone number, thereby saving the user money from mis-dialed calls.

The previous description of the preferred embodiments are provided to enable any person skilled in the art to make or use the radiotelephone with the enhanced GUI. Various modifications to these embodiments will be readily apparent to those skilled in the art, and the generic principles defined herein can be applied to other embodiments without the use of the inventive faculty. For example the function soft-key labels can be given different names than those referred to here and still provide the same function without the use of the inventive faculty.

We claim:

1. A radiotelephone comprising:

a radiotelephone housing;

a display mounted on the radiotelephone housing;

a controller positioned in the radiotelephone housing and coupled to the display;

a memory coupled to the controller; and a plurality of input keys mounted on the radiotelephone housing and electrically coupled to the controller;

the controller causing the display to present various lists, wherein, a title message is presented at a top portion of the display when a top portion of any of the various lists is presented on the display;

an end-of-list indicator is presented at a bottom portion of the display when a bottom portion of any of the various lists is presented on the display;

a highlighter is presented on the display to highlight a currently displayed item of any of the various lists;

a dynamic scroll indicator is presented on the display to indicate possible scrolling directions, the dynamic scroll indicator having multiple appearances for different display conditions, wherein the multiple appearances of the dynamic scroll indicator comprises:

a downward pointing arrow when the title message is displayed and a first item of any of the various lists is highlighted to indicate that a possible scrolling direction is down;

an arrow that points both up towards the top portion of the display and downward towards the bottom portion of the display to indicate that the possible scrolling direction is up and down when neither the title message nor the end-of-list indicator are displayed; and an upward pointing arrow when the end-of-list indicator is displayed to indicate that the possible scrolling direction is up;

a smooth scroll feature, wherein, when the title message is displayed and a last currently displayed item is not highlighted, a user can hold depressed a down input key to sequentially highlight a next currently displayed item and the user can hold depressed an up input key to sequentially highlight a previous currently displayed item, when the title message is displayed and the last currently displayed item is highlighted, the user can hold depressed the down input key to cause currently displayed items to scroll vertically upward across the display with top-most displayed items scrolling off of the top portion of the display and new items scrolling onto the display from the bottom portion of the display, the currently displayed items scrolling at a smooth scroll rate, when the dynamic scroll indicator indicates that the possible scrolling directions are up and down and the title message is not displayed, the user can hold depressed the down input key to cause the currently displayed items to scroll upward across the display at the smooth scroll rate, and the user can hold depressed the up input key to cause the currently displayed items to scroll downward across the display at the smooth scroll rate, and when the end-of-list indicator appears on the display, the user can hold depressed the up input key to cause displayed lines to scroll downward across the display at the smooth scroll rate;

a search function that allows a user to press an input key corresponding to a desired letter to cause a currently displayed list to automatically jump to a first item of the currently displayed list that begins with the desired letter and then display and highlight the first item of the currently displayed list that begins with the desired letter; and a fast scroll rate for the search function, wherein, when the user presses the input key corresponding to the desired letter and the desired letter is alphabetically subsequent to the first letter of a currently highlighted item, a page down occurs until the first item that begins with the desired letter is displayed and highlighted, the page down occurring at the fast scroll rate so that the currently displayed items scroll off of the top portion of the display and the new items scroll onto the display from the bottom portion of the display, and when the user presses the input key corresponding to the desired letter and the desired letter alphabetically precedes the first letter of the currently highlighted item, a page up occurs until the first item that begins with the desired letter is displayed and highlighted, the page up occurring at the fast scroll rate so that the currently displayed items scroll off of the bottom portion of the display and the new items scroll onto the display from the top portion of the display.

2. The radiotelephone as in claim 1, wherein when the currently displayed items scroll at the smooth scroll rate, currently displayed scrolling items are substantially readable.

3. The radiotelephone as in claim 2, wherein the fast scroll rate is a faster scrolling speed than the smooth scroll rate.

4. The radiotelephone as in claim 3, wherein during the fast scroll rate, the currently displayed items are substantially not readable, and currently displayed scrolling items appear as a stream of moving pixels.

5. The radiotelephone as in claim 4, wherein an amount of pixels per display line limits an amount of information that can be displayed, so that the dynamic scroll indicator is a miniature dynamic scroll indicator that comprises:

an up arrowhead when the possible scrolling direction is up;

a down arrowhead when the possible scrolling direction is down; and a down arrowhead and an up arrowhead when the possible scrolling directions are up and down.

6. The radiotelephone as in claim 4, wherein the dynamic scroll indicator is presented at a side portion of the display.

7. The radiotelephone as in claim 6, wherein the title message has a right horizontal line extending from a right side of the title message and a left horizontal line extending from a left side of the title message.

8. The radiotelephone as in claim 7, wherein when the title message is displayed, the dynamic scroll indicator is coupled to the title message.

9. The radiotelephone as in claim 8, wherein the end-of-list indicator is a horizontal line, and when the end-of-list indicator is displayed, the dynamic scroll indicator is coupled to the horizontal line.

10. The radiotelephone as in claim 9, wherein the highlighter is for indicating which currently displayed item can be selected, wherein a highlighted item flashes at least one time when the highlighted item is selected.

11. A radiotelephone comprising:

a radiotelephone housing;

a display positioned in the radiotelephone housing;

a controller positioned in the radiotelephone housing and coupled to the display;

a memory coupled to the controller; and inputs electrically coupled to the controller, the controller causing the display to present various lists, wherein, a title message is presented at a top portion of the display when a top portion of any of the various lists is presented on the display;

an end-of-list indicator is presented at a bottom portion of the display when a bottom portion of any of the various lists is presented on the display;

a highlighter is presented on the display to highlight a currently displayed item of any of the various lists; and a dynamic scroll indicator is presented on the display to indicate possible scrolling directions, the dynamic scroll indicator having multiple appearances for different display conditions; and wherein a search function allows a user to press an input key corresponding to a desired letter to cause a currently displayed list to automatically jump to a first item of the currently displayed list that begins with the desired letter and then display and highlight the first item of the currently displayed list that begins with the desired letter, the search function having a fast scroll rate, wherein, when the user presses the input key corresponding to the desired letter and the desired letter is alphabetically subsequent to the first letter of a currently highlighted item, a page down occurs until the first item that begins with the desired letter is displayed and highlighted, the page down occurring at the fast scroll rate so that the currently displayed items scroll off of the top portion of the display and the new items scroll onto the display from the bottom portion of the display, and when the user presses the input key corresponding to the desired letter and the desired letter alphabetically precedes the first letter of the currently highlighted item, a page up occurs until the first item that begins with the desired letter is displayed and highlighted, the page up occurring at the fast scroll rate so that the currently displayed items scroll off of the bottom portion of the display and the new items scroll onto the display from the top portion of the display.

12. The radiotelephone of claim 11, wherein the indicator directed downward is an arrow having a tail extending from a line of the title message when the title message is displayed and a first item of a list is highlighted to indicate that a possible scrolling direction is presented.

13. The radiotelephone of claim 11, wherein the indicator directed upward is an arrow having a tail extending from a line of the end-of-list indicator to indicate a possible scrolling direction is presented.

14. The radiotelephone as in claim 11, further comprising a context-sensitive symbol that is actively presented on the display only when a context sensitive menu is available for a highlighted item.

15. The radiotelephone as in claim 11, wherein the dynamic scroll indicator is presented at a side portion of the display.

16. The radiotelephone as in claim 11, wherein the title message includes a right horizontal line extending from a right side of the title message and a left horizontal line extending from a left side of the title message.

17. The radiotelephone as in claim 11, wherein the highlighter is for indicating which currently displayed item can be selected, wherein a highlighted item flashes at least one time when the highlighted item is selected.

18. The radiotelephone as in claim 11, wherein the end-of-list indicator is a horizontal line.

19. A graphic user interface (GUI) optimized for a radiotelephone display, the GUI to present on the radiotelephone display various lists such as text messages, information lists, and menus, the GUI presenting the various lists using a list display format, the last display format comprising:

a title message is presented at a top portion of the radiotelephone display when a top portion of any of the various lists is presented on the display;

an end-of-list indicator is presented at a bottom portion of the radiotelephone display when a bottom portion of any of the various lists is presented on the display;

a highlighter is presented on the radiotelephone display to highlight a currently displayed item of any of the various lists;

a dynamic scroll indicator is presented on the radiotelephone display to indicate possible scrolling directions, the dynamics scroll indicator having multiple appearances for different display conditions, the multiple appearances of the dynamic scroll indicator include:

an indicator directed downward and extending from the title message only when a first item of a list is presented on the display, an indicator directed upward and extending from an end-of-list indicator only when the last item of a list is presented on the display, and an indicator directed upward and downward when the first and last messages of list are presented, and a search function that allows a user to press an input key corresponding to a desired letter to cause a currently displayed list to automatically jump to a first item of the currently displayed list that begins with the desired letter and then display and highlight the first item of the currently displayed list that begins with the desired letter, the search function having a fast scroll rate, wherein, when the user presses the input key corresponding to the desired letter and the desired letter is alphabetically subsequent to the first letter of a currently highlighted item, a page down occurs until the first item that begins with the desired letter is displayed and highlighted, the page down occurring at the fast scroll rate so that the currently displayed items scroll off of the top portion of the display and the new items scroll onto the display from the bottom portion of the display, and when the user presses the input key corresponding to the desired letter and the desired letter alphabetically precedes the first letter of the currently highlighted item, a page up occurs until the first item that begins with the desired letter is displayed and highlighted, the page up occurring at the fast scroll rate so that the currently displayed items scroll off of the bottom portion of the display and the new items scroll onto the display from the top portion of the display.

20. The radiotelephone of claim 19, wherein the indicator directed downward is an arrow having a tail extending from a line of the title message when the title message is displayed and a first item of a list is highlighted to indicate that a possible scrolling direction is presented.

21. The radiotelephone of claim 19, wherein the indicator directed upward is an arrow having a tail extending from a line of the end-of-list indicator to indicate the possible scrolling direction is presented.

22. The radiotelephone as in claim 19, further comprising a context-sensitive symbol that is actively presented on the display only when a context sensitive menu is available for a highlighted item.

23. The radiotelephone as in claim 19, further comprising a search function that allows a user to press an input key corresponding to a desired letter to cause a currently displayed list to automatically jump to a first item of the currently displayed list that begins with the desired letter and then display and highlight the first item of the currently displayed list that begins with the desired letter.

* * * * *